United States Patent
Chen (10) Patent No.: US 10,810,738 B1
(45) Date of Patent: Oct. 20, 2020

(54) MARKER-LESS ALIGNMENT OF DIGITAL 3D FACE AND JAW MODELS

(71) Applicant: BELLUS3D, Los Gatos, CA (US)

(72) Inventor: Shenchang Eric Chen, Los Gatos, CA (US)

(73) Assignee: BELLUS 3D, INC., Campbell, CA (US)

( * ) Notice: Subject to any disclaimer, the term of this patent is extended or adjusted under 35 U.S.C. 154(b) by 0 days.

(21) Appl. No.: 16/360,305

(22) Filed: Mar. 21, 2019

Related U.S. Application Data (60) Provisional application No. 62/776,945, filed on Dec. 7, 2018.

(51) Int. Cl.
| | |
|---|---|
| G06T 7/00 | (2017.01) |
| G06T 7/73 | (2017.01) |
| G06T 7/33 | (2017.01) |
| G06K 9/00 | (2006.01) |
| G06T 19/20 | (2011.01) |

(52) U.S. Cl.
CPC ........ *G06T 7/0014* (2013.01); *G06K 9/00281* (2013.01); *G06T 7/337* (2017.01); *G06T 7/344* (2017.01); *G06T 7/74* (2017.01); *G06T 7/75* (2017.01); *G06T 19/20* (2013.01); *G06T 2207/10028* (2013.01); *G06T 2207/30036* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2002/0025503 A1* | 2/2002 | Chapoulaud | A61C 7/146 433/24 |
| 2002/0180760 A1* | 12/2002 | Rubbert | G16H 50/50 345/630 |
| 2003/0096210 A1* | 5/2003 | Rubbert | A61C 7/146 433/24 |
| 2004/0015327 A1* | 1/2004 | Sachdeva | A61C 7/002 702/167 |
| 2004/0214128 A1* | 10/2004 | Sachdeva | A61C 7/00 433/24 |
| 2005/0048432 A1* | 3/2005 | Choi | A61C 7/00 433/24 |
| 2005/0203726 A1* | 9/2005 | Marshall | A61C 9/004 703/11 |
| 2006/0003292 A1* | 1/2006 | Lauren | A61C 7/00 433/215 |
| 2006/0127852 A1* | 6/2006 | Wen | A61C 9/0046 433/213 |
| 2006/0127854 A1* | 6/2006 | Wen | A61C 7/00 433/213 |

(Continued)

*Primary Examiner* — Martin Mushambo
(74) *Attorney, Agent, or Firm* — Soquel Group LLC (57) ABSTRACT

The invention aligns a digital face model from a 3D face scanner with a 3D teeth model from an intraoral scan produced by an intraoral scanner without using external markers. The alignment proceeds in two steps. In the first step, the teeth part of a subject whose teeth are clenched, referred to as a clenched-teeth face scan, is aligned with the teeth model from an intraoral jaw scan to obtain a first transformation matrix. In the second step, a face model of a subject with a normal facial expression is aligned with the clenched-teeth face model of the same subject using an ICP algorithm.

28 Claims, 8 Drawing Sheets

(56) References Cited

U.S. PATENT DOCUMENTS

| | | | | |
|---|---|---|---|---|
| 2007/0154866 A1* | 7/2007 | Hall | ............... | A61C 1/084 |
| | | | | 433/213 |
| 2008/0286715 A1* | 11/2008 | Choi | ............... | A61C 9/0006 |
| | | | | 433/37 |
| 2012/0015316 A1* | 1/2012 | Sachdeva | ............... | G06T 17/00 |
| | | | | 433/24 |
| 2012/0015330 A1* | 1/2012 | Zhivago | ............... | A61C 13/0004 |
| | | | | 433/215 |
| 2012/0095732 A1* | 4/2012 | Fisker | ............... | A61C 5/77 |
| | | | | 703/1 |
| 2013/0218530 A1* | 8/2013 | Deichmann | ............... | A61C 5/77 |
| | | | | 703/1 |
| 2014/0120493 A1* | 5/2014 | Levin | ............... | A61C 9/0066 |
| | | | | 433/29 |
| 2014/0329194 A1* | 11/2014 | Sachdeva | ............... | A61C 7/002 |
| | | | | 433/24 |
| 2014/0379356 A1* | 12/2014 | Sachdeva | ............... | A61C 7/002 |
| | | | | 705/2 |
| 2015/0086939 A1* | 3/2015 | Fisker | ............... | A61C 9/0053 |
| | | | | 433/29 |
| 2016/0095670 A1* | 4/2016 | Witte | ............... | A61C 7/146 |
| | | | | 433/3 |
| 2016/0124920 A1* | 5/2016 | Golay | ............... | G16H 15/00 |
| | | | | 705/3 |
| 2016/0250006 A1* | 9/2016 | Fisker | ............... | A61C 9/0053 |
| | | | | 433/213 |
| 2017/0085863 A1* | 3/2017 | Lopez | ............... | H04N 13/261 |
| 2017/0100089 A1* | 4/2017 | Chang | ............... | A61B 6/0492 |
| 2017/0265977 A1* | 9/2017 | Fisker | ............... | A61C 11/006 |
| 2017/0286759 A1* | 10/2017 | Yao | ............... | G06K 9/00308 |
| 2018/0235437 A1* | 8/2018 | Ozerov | ............... | A61C 7/002 |

\* cited by examiner

MARKER-LESS ALIGNMENT OF DIGITAL 3D FACE AND JAW MODELS

BACKGROUND

Recent advances in intraoral scanners, 3d face scanners, and 3d printers have transformed dentistry from a traditional workflow of making dental impressions and casts to a fully digital one. In a digital workflow, a patient's face is first scanned with a face scanner to create a digital 3D face model. An intraoral scanner can be used to a create a highly accurate digital dental cast. The digital dental cast is aligned with the 3D face model, so it can be inspected in three dimensions on a computer screen. The digital dental cast can be modified with a CAD/CAM tool and the enhanced teeth can be immediately visualized on screen model from all directions. Once the design is complete, new teeth can be made from the digital model by a 3D printer or a CNC machine.

In order visualize what the new dental cast will look like on a patient's face, the 3D models from the two scanners, the 3D face scanner and the intraoral scanner, are aligned. Then, the existing 3D teeth model as well as the enhanced teeth can be positioned in the exact position within the a 3D model of the subject's face. However, teeth scans from face scanners typically don't produce sufficient detail to enable precise alignment with a digital dental cast model from an intraoral scanner. Most commercial systems, such as those from AFT Dental System, use external markers to provide visual guidance for an operator to manually align the 3D models.

Typically, a 3D face scanner is used to scan a patient's face twice: 1) with a smile facial expression, and 2) with the patient biting a dental impression tray with external markers. In the two face scans, some common face markers may be placed on the patient's face, for example on the forehead. An intraoral scanner is used to scan both the patient's teeth and the dental impression tray with external markers. All four scans are brought into the same 3D alignment system where the two face scans are aligned using the common face markers, and the teeth scan is aligned with the face scan using the dental impression tray scan. The complete process may be laborious and time consuming.

The recent introduction of low cost, commercially available depth sensing cameras, such as those provided by mobile devices, makes it possible to generate 3D face models. Depth cameras, as they are referred to herein, provide distance, or depth, images of objects in the field of view of the camera in real-time. By taking multiple depth images of a human head from different directions and computing their head pose data, it is possible to combine the depth images to generate a 3D face model. Examples of commercially available depth cameras are KINECT by MICROSOFT, PRIMESENSE by APPLE COMPUTER, and the BELLUS3D FACE CAMERA.

Thus, there is an opportunity to simplify the process of aligning a 3D face model to an intraoral scan by eliminate the need to use markers. It is with respect to these considerations and others that the present invention has been made.

SUMMARY OF THE DESCRIPTION

Various embodiments of the subject are directed to the automatic alignment of a 3D model of a subject's face with a jaw scan generated by an intraoral scanner, without the use of external markers. The alignment method is fully automatic.

The invention aligns a digital face model from a 3D face scanner with a 3D teeth model from an intraoral scan produced by an intraoral scanner without using external markers. The alignment proceeds in two steps. In the first step, the teeth part of a subject whose teeth are clenched, referred to as a clenched-teeth face scan, is aligned with the teeth model from an intraoral jaw scan to obtain a first transformation matrix. This is performed by recovering a 3D-to-2D transformation between matching image feature points and then applying the transformation. In the second step, a face model of a subject with a normal facial expression is aligned with the clenched-teeth face model of the same subject using an ICP algorithm. In certain embodiments, the ICP algorithm considers 3D points less affected by an expression change to obtain a second transformation matrix. It should be noted that the two steps can be executed in parallel or in reverse.

In certain embodiments, only a clenched-teeth scan is aligned to a jaw scan. In this case only the first transformation is applied to the clenched-teeth scan. In other embodiments, a first transformation that aligns a clenched-teeth face scan to a jaw scan is first obtained and then then a second transformation that aligns a normal face scan to the clenched-teeth face scan is determined. In this case, the first and second transformation matrices are applied to the normal face model to align it with the jaw scan.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Intraoral scanner or dental scanner—refers to a scanning device or camera that is placed inside a subject's oral cavity (mouth) and generates a 3D model that represents the oral cavity that is suitable to create dental casts. Intraoral scanners typically generate 3D models that are represented in a file format such as STL, Standard Triangle Language, that represents the surface geometry of the inside of the mouth without any representation of color, or texture. An intraoral scanner usually performs three separate scans: 1) upper jaw, 2) lower jaw, and 3) bite scan. The bite scan is used to align the upper jaw and the lower jaw scans.

Jaw scan—refers to a 3D model of the upper jaw and lower jaw of a subject where the upper and lower jaws are registered, i.e. they are placed in a single image space or 3D coordinate system exactly as they appear in the subject's jaw. In certain embodiments, a jaw scan may in face consist of two models, one for the upper jaw and one for the lower jaw. In other embodiments, a jaw scan is a single 3D model of both the lower and upper jaw. In yet other embodiments, a jaw scan may include only a 3D model of the upper or lower jaw.

3D Face scanner or face scanner—refers to a scanning device or video camera that circles around a patient's head to capture the head from different directions and then creates a 3D model that includes points, polygons (connectivity of the points), and a color texture map of the surface. An example of such scanner is BELLUS 3D Face Camera Pro. The face models are usually saved in a 3D file format such as .STL, .PLY or .OBJ. A 3D face scanner may be a special purpose camera that is tethered to a processing device or it may be a single device that performs both facial capture and 3D processing. An example of such a single device is an APPLE IPHONE X. Importantly, a 3D face scanner must capture depth or range information in addition to color information in order to enable generation of a 3D face model with color. Typically, both color and depth data are provided as two-dimensional frames, or arrays, of pixels. Typically, color data is in the RGB color space. Depth information may be characterized in a variety of ways, such as millimeters of distance from the camera to an object. Depth data may also indicate whether a pixel is closer than a minimum range value or farther than a maximum range value.

Subject or user—a person whose mouth, face and teeth are scanned using an intraoral scanner and a face scanner.

Generalized Operation

The operation of certain aspects of the invention is described below with respect to FIGS. 1-6.

Figure 1A:
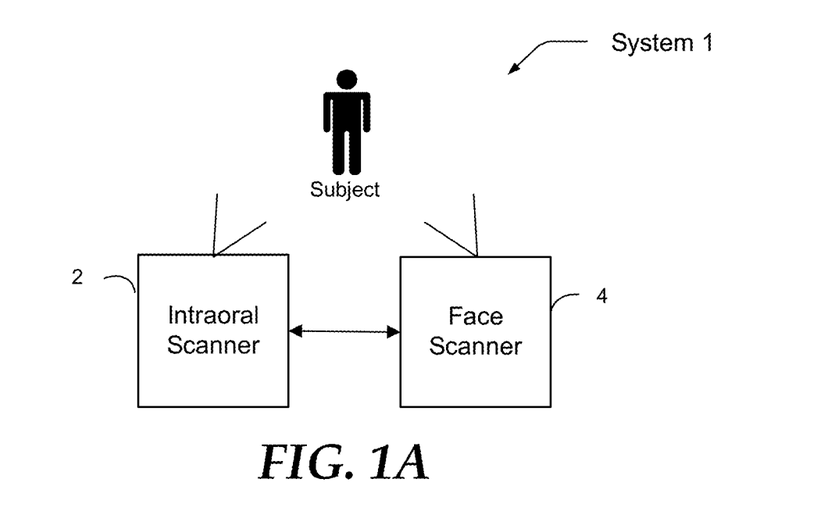
FIG. 1A is a generalized system diagram of an embodiment of a system that aligns a 3D face scan with an intraoral scan in which an intraoral scanner scans the oral cavity of a subject and a face scanner produces a 3D model of the subject's face.
Figure 1B:
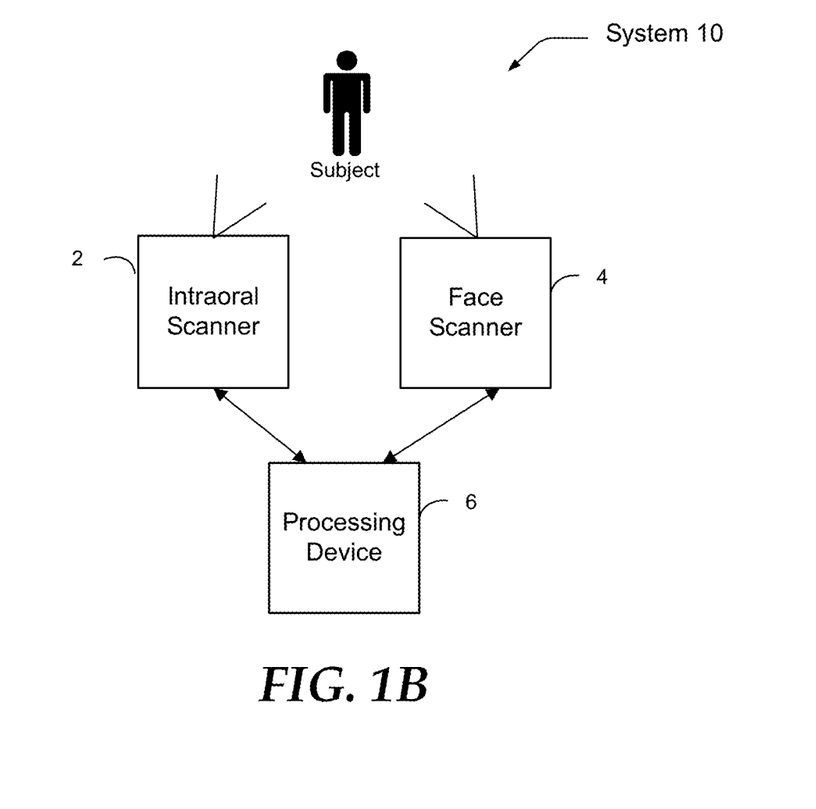
FIG. 1B is a generalized system diagram of another embodiment of a system that aligns a 3D face scan with an intraoral scan in which an intraoral scanner scans the oral cavity of a subject and a face scanner produces a 3D model of the subject's face.
Figure 3:
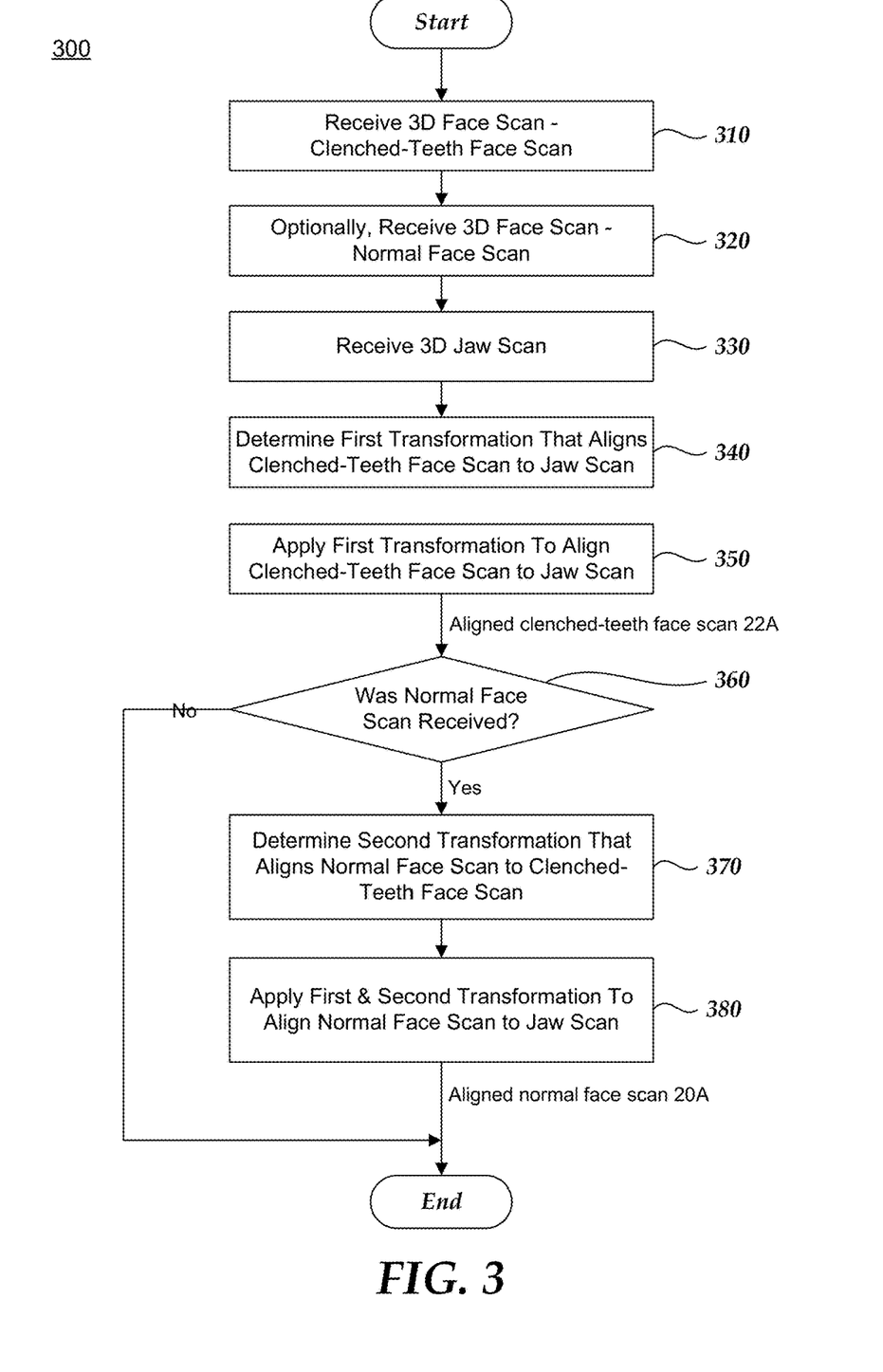
FIG. 3 illustrates a generalized method for aligning clenched-teeth face scan with a jaw scan or a normal face scan with a jaw scan so that the 3D model of the face is rotated and translated, i.e. transformed, such that the teeth from the face scan are precisely aligned or positioned with respect to the jaw scan.
Figure 4:
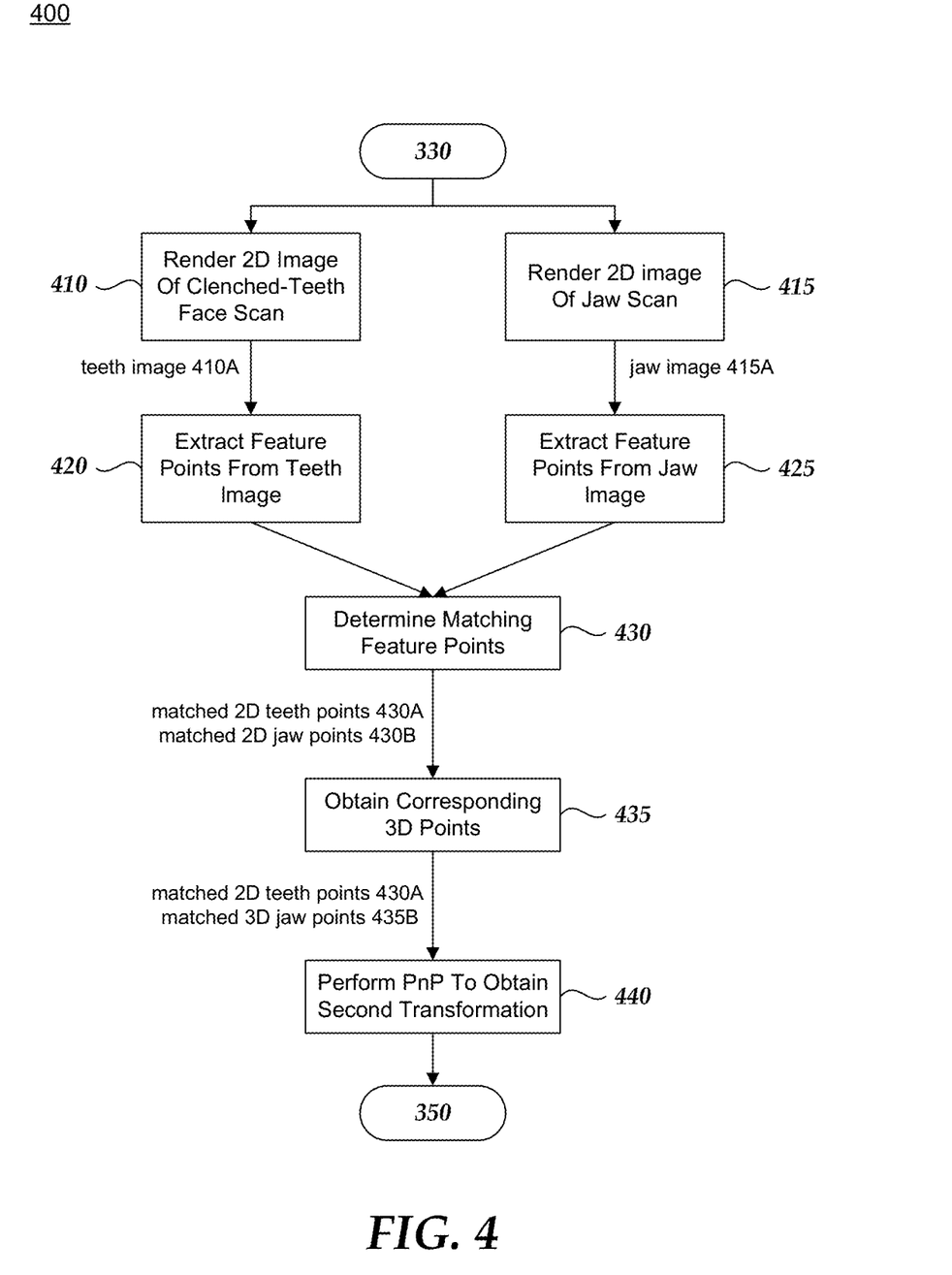
FIG. 4 is a flow diagram of one embodiment of a method that aligns a clenched-teeth 3D face model with a 3D scan of the subject's jaw from an intraoral scan.

FIGS. 1A-B are generalized block diagrams of two embodiments of a markerless teeth alignment system. FIG. 1A shows an embodiment of a system 1 in which an intraoral scanner 2 captures or scans the oral cavity, i.e. the inside of the mouth, of a subject and a face scanner 4 produces a 3D representation of the subject's face. In system 100 the processing of the method for aligning the various scans, described in greater detail with reference to FIGS. 3 and 4, is performed either by intraoral scanner 2 or face scanner 4. For example, face scanner 20 may be a commercial mobile device such as an IPHONE MODEL X from APPLE INC. that can both perform image capture, 3D model generation and the alignment processing.

FIG. 1B shows an embodiment of a system 10 in which an intraoral scanner 2 captures an image, i.e. scans, the mouth of the subject and face scanner 4 generates a 3D model of the subject's face. In system 10 the processing of the method for aligning the various scans, described in greater detail with reference to FIGS. 3 and 4, is performed by a separate processing device 6. Thus, in system 10 intraoral scanner 2 and face scanner 4 communicate scanned images to processing device 6 which performs alignment processing.

Other embodiments that allocate features and processing among intraoral scanner 2, face scanner 4 and processing device 6 may be employed without departing from the spirit and scope of the subject invention. For example, processing steps described with reference to FIGS. 3 and 4 may be allocated freely among the three devices, intraoral scanner 2, face scanner 4 and processing device 6. Further, intraoral scanner 2 and face scanner 4 may be the same scanning device in certain embodiments.

Figure 2A:
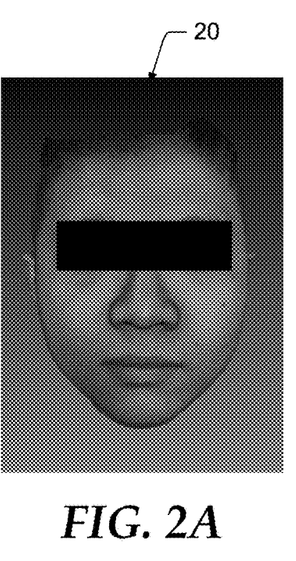
FIG. 2A illustrates an example of a normal face scan produced by the face scanner, which is a face scan of a subject where the subject's face has a smiling or relaxed or otherwise regular expression in which the teeth are visible.
Figure 2B:
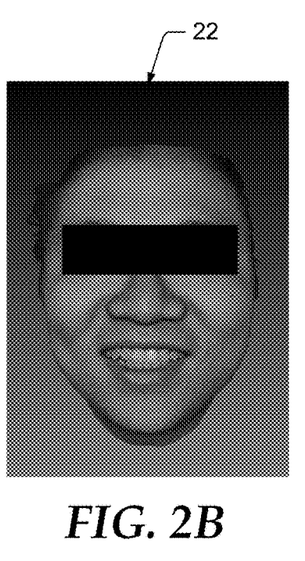
FIG. 2B illustrates an example clenched-teeth face scan produced by the face scanner, which is a face scan of the subject where the subject's top row and bottom row of teeth are both touching and visible.
Figure 2C:
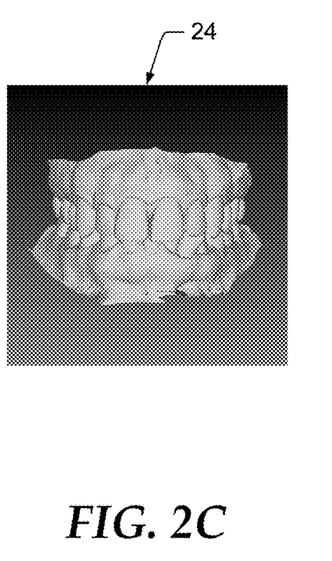
FIG. 2C is an example of a jaw scan, which is a 3D model of the upper and lower teeth produced by intraoral scanner in which the upper and lower jaws are clenched such that the front teeth in the top row of teeth touch the front teeth in the lower row of teeth.

The method described hereinbelow with reference to FIGS. 3 and 4 processes three digital images, two of which are captured by a face scanner and the third is captured by an intraoral scanner. FIGS. 2A-C illustrate examples of the three 3D models used by the method. The three models are as follows.

FIG. 2A illustrates an example of a normal face scan 20 produced by face scanner 4, which is a face scan of a subject where the subject's face has a smiling or relaxed or otherwise regular expression in which the teeth are visible. Since one application of the subject invention is to fit an improved or modified version of the subject's teeth into normal face scan 20 the subject is usually directed to smile or otherwise present a pleasing facial expression. However, the subject invention does not require any particular expression; further, it doesn't require that the teeth be visible, i.e. the mouth may be closed.

FIG. 2B illustrates an example clenched-teeth face scan 22 produced by face scanner 4, which is a face scan of the subject where the subject's top row and bottom row of teeth are both touching and visible. This expression is intended to mirror the expression the subject's face will take on during an intraoral bite scan in which the upper and lower jaws are clenched.

FIG. 2C is an example of a jaw scan 24, which is a 3D model of the upper and lower teeth produced by intraoral scanner 2 in which the upper and lower jaws are clenched such that the top row of teeth touch the lower row of teeth.

FIG. 3 illustrates a generalized method 300 for aligning normal face scan 20 with jaw scan 24 so that the 3D model of the face represented by normal face scan 20 is rotated and translated, i.e. transformed, such that the normal face scan 20 is aligned with jaw scan 24. Proper alignment of normal face scan 20 means, in this case, that normal face scan 20 is positioned within the 3D space or coordinate system of jaw scan 24 without using external markers. This is required because jaw scan 24 is produced by a different device, i.e. intraoral scanner 2 which is typically from a different manufacturer than face scanner 4. Typically, the origin of jaw scan 24 is the center-point of the jaw. In contrast, the origin of the coordinate system of normal face model 20 is typically the center-point of the head. Thus, the problem of bringing the two models into alignment is tantamount to rotating and translating the normal face model 20 such that the subject's 3D teeth model, represented by jaw scan 24 fit perfectly into the oral cavity of normal face model 20. In this approach, clenched teeth face scan 22 is an intermediary scan that shares common points with both normal face scan 20 and jaw scan 24 and facilitates alignment. Since the subject's upper jaw and lower jaw, in clenched-teeth scan 22, are already aligned with jaw scan 24, they will also be aligned with normal face scan 20. It may be appreciated that alignment assumes that the three models, normal face scan 20, clenched-teeth scan 22, and jaw scan 24 are all at the same scale, so no scaling is necessary to bring the models into alignment.

Method 300 includes one step that aligns clenched-teeth face scan 22 with jaw scan 24 and a second step that aligns normal face scan 20 with clenched-teeth face scan 22. It should be noted that the two steps can be processed in parallel or in reverse to align normal face scan 20 to jaw scan 24. Method 300 performs an automatic alignment using facial feature detection to align a 3D face scan with a 3D intraoral scan that eliminates the need for external markers to assist with alignment. Further, in certain embodiments only one face scan, clenched-teeth face scan 22, is aligned with jaw scan 24; in such embodiments, only the first step of method 300 is performed. In yet other embodiments, there may be several versions of normal face scan 20, in which case the second step may be repeated for each normal face scan to be aligned with jaw scan 24.

At step 310 a first 3D face scan of a subject, clenched-teeth face scan 22, is received from face scanner 4. At step 320 a second 3D face scan of the subject's face, normal face scan 20, is received from face scanner 4. At step 330 a jaw scan of the subject's upper and lower jaw, jaw scan 24, is received from intraoral scanner 2. The order in which these three scans is performed is arbitrary. Each of scans 20, 22 and 24 is represented as a 3D model. Each scan or 3D model may be a data structure stored on disk or in a computer memory, or more typically, each scan is received in a file in a standard 3D file format such as STL, .PLY or .OBJ. Thus, the term scan as used for example in normal face scan 20 refers to a 3D model that is generated and processed by method 300. As previously discussed, jaw scan 24 may in fact be two separate scans, one of the subject's upper jaw and one of the subject's lower jaw. However, in this case the two scans may be concatenated in a single file, thus, without loss of generality the following description assumes that jaw scan 24 is a single 3D model. Similarly, jaw scan 24 may only include a the upper jaw scan. Method 300 can operate on only the upper jaw, in the case that lower jaw scan is missing.

At step 340 clenched-teeth face scan 22 is aligned to jaw scan 24. Essentially, at this step a first transformation matrix is determined which when applied to clenched-teeth face scan 22 performs the necessary rotation and translation in 3 dimensions (x, y, z) to align, or transform, clenched-teeth face scan 20 into the same coordinate system as jaw scan 24. This step is described in further detail in method 400, illustrated in FIG. 4.

At step 350 the first transformation is applied to clenched-teeth scan 22 to align it with jaw scan 24. This results in a 3D model of clenched-teeth face scan 22, referred to as aligned clenched-teeth face scan 22, that is aligned with jaw scan 24.

At step 360 a determination is made as to whether a second face scan, normal face scan 20, has been received and needs to be processed. In not, the method terminates. If so, processing flows to step 370.

At step 370 normal face scan 20 is aligned to clenched-teeth face scan 22. Essentially, at this step a second transformation matrix is determined which when applied to normal face scan 20 performs the necessary rotation and translation in 3 dimensions (x, y, z) to align, or transform, normal face scan 20 into the same coordinate system as clenched-teeth face scan 22. This step is described in further detail in method 500, illustrated in FIG. 5.

At step 380 the first and second transformation, determined in the preceding step, is applied to normal face scan 20 to bring it into alignment with jaw scan 24. This results in a 3D model of the normal face scan 20, referred to as aligned normal face scan 20A, that aligns perfectly with jaw scan 24.

At this point a dentist, dental technician, the subject him or herself or another person can combine normal face scan 20 or clenched-teeth face scan 22 with jaw scan 24 to show the subject's teeth set inside a face model. Further, jaw scan 24 can be enhanced or edited to show the potential result of dental work to improve the subject's jaw or teeth. Such procedures are often termed "smile design." Aligned normal face model 20A and/or aligned clenched-teeth face model 22A enables the dentist to visualize how enhanced teeth will look inside the subject's face. If any design or reconstructive work is done to the jaw scan, by adding new teeth for example, the aligned model is still valid and the face will remain aligned with the new teeth smile design as long as the individual tooth modifications do not alter the jaw's orientation and position. This allows the new teeth to be displayed with the subject's face scan to show how the new teeth or smile will look after the actual dental work is performed. The procedures performed by the dentist or technician are outside the scope of the subject invention.

1. Align Clenched-Teeth Face Scan to Jaw Scan 3D face scanners are typically designed to scan a subject's head from some distance-They generally do not capture the precise shape of each individual tooth and it is not possible to align the teeth from a 3D face scan with the teeth from an intraoral jaw scan precisely. This is illustrated visually in FIG. 7A. As previously discussed, 3D face scanners also create texture maps at a higher resolution than 3D geometry and individual teeth are more discernable when the 3D information is combined with a texture map as illustrated in FIG. 7B.

Figure 7A:
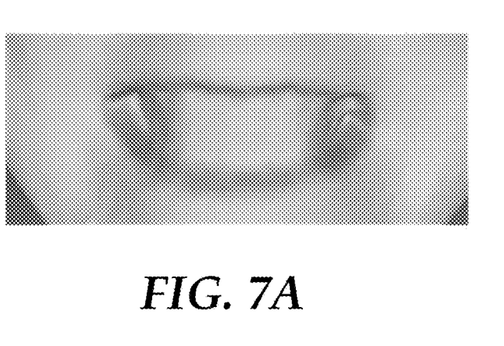
FIG. 7A shows a 2D snapshot of a 3D face scan surface mesh taken by a commercial face scanner in which only the 3D information is used to generate the 2D snapshot.
Figure 7B:
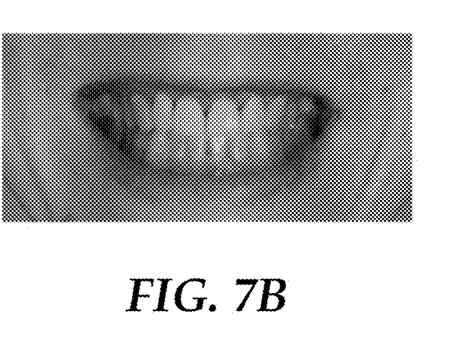
FIG. 7B shows a corresponding color image created by rendering the surface mesh of FIG. 7A with a texture map.

FIG. 7A shows a 2D snapshot of a 3D face scan surface mesh taken by a commercial face scanner in which only the 3D information is used. As shown, the mesh geometry is low resolution and the teeth areas is indistinct. FIG. 7B shows a corresponding color image created by rendering the same surface mesh with a texture map. As shown, there is considerably more resolution and the teeth appear distinctly.

Some, but not all, intraoral scanners also capture color in addition to 3D geometry. In cases where intraoral scanner 2 provides color information substantial detail is available to match features in intraoral scan 24 with clenched-teeth scan 22. But if no color information is provided by intraoral scanner 2 then feature point detection and feature matching is not feasible.

FIG. 4 is a flow diagram of one embodiment of a method 400 that aligns a 3D face model, clenched-teeth face model 22, with a 3D scan of the subject's jaw, jaw scan 24, from an intraoral scan. Method 400 uses an algorithm called Perspective-n-Point ("PnP"). Given some number of 3D points and their corresponding 2D image points, PnP estimates a rigid body transformation (translation and rotation) that projects the 3D points to match the 2D image points. PnP can be improved to deal with outliers using an iterative approach that minimizes the reprojection error to deal with sensor noise. To set up for use of the PnP algorithm matching 2D and 3D points must first be obtained.

At step 410 a 2D grayscale image of 3D clenched-teeth scan 22 in a known, frontal, position is rendered. It may be appreciated that it is assumed that intraoral scanner 2 and face scanner 4 are calibrated and that the scans are taken with the subject facing the camera. Thus, the procedure for obtaining 2D frontal images from the 3D models is straightforward and a variety of programming libraries may be used to obtain a 2D snapshot. For example, the OPENCV programming library includes a function named projectPoints that projects 3D points to an image plane which can be used for this purpose. Information about the OPENCV programming library projectPoints can be found on the worldwide web at https://docs.opencv.org/2.4/modules/calib3d/doc/camera_calibration_and_3d_reconstruction.html?highlight=projectpoints#cv2.projectPoints. It may be appreciated that projectPoints takes as input at 3XN/NX3 array of object points and returns a 2XN/NX 2 array of corresponding points, or pixels, in an image plane. The function also requires intrinsic and extrinsic camera calibration information which is assumed to be known for both face scanner 4 and intraoral scanner 2. Thus, there is a correspondence between 3D points and 2D image pixels, i.e. the function projectPoints returns a 2D image point for each 3D point provided as input and conversely there is a corresponding 3D point for each pixel occupied by the 2D point computed by projectPoints. If more than one 3D points project to a 2D image pixel, the 3D point closest to the imaging camera is chosen. The grayscale value of each of the 2D image pixel is computed from its corresponding 3D point's color value (converted to grayscale) in the texture map of the face scan as described above. It may be further appreciated that projectPoints performs well known computer vision calculations and thus method 500 is not dependent on the OPENCV programming library in any way. Another method of generating the 2D frontal image can be accomplished using a 3D rendering library, such as OpenGL, that renders the 3D face scan mesh with a corresponding texture map as a 2D image.

As previously discussed, it is assumed that 3D models produced by face scanner 4 provide color texture maps. Thus, the 2D image obtained at step 410, referred to as teeth image 410A, is a grayscale 2D image computed from the color texture map.

Figure 8A:
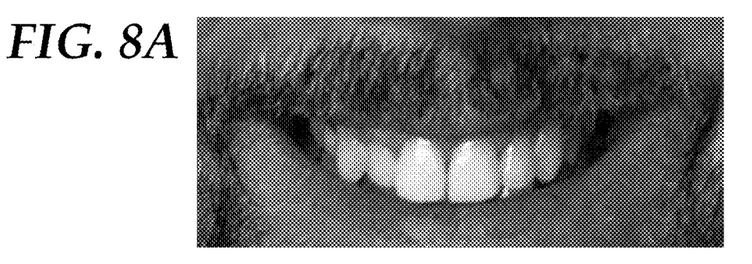
FIG. 8A is an image of a frontal view of the teeth area of a subject, rendered from a clenched-teeth scan.
Figure 8B:
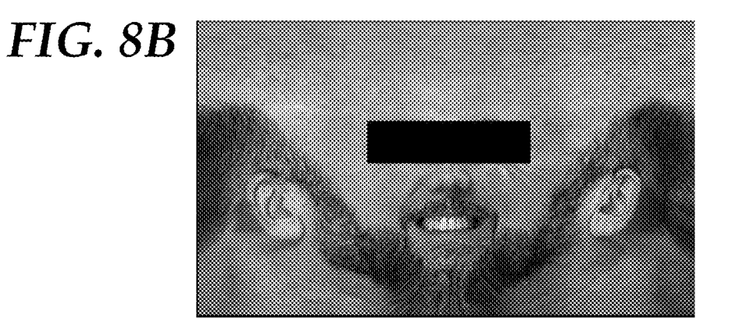
FIG. 8B is a texture map that corresponds to the example of the clenched-teeth scan depicted in FIG. 8A.
Figure 8C:
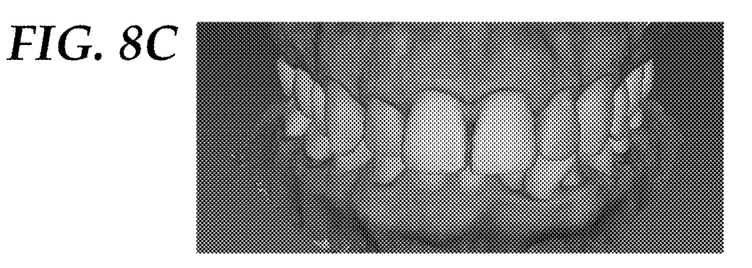
FIG. 8C is a grayscale image of a frontal view of the teeth area of the subject, rendered from a color jaw scan

At step 415, a frontal 2D image of 3D jaw scan 24 is similarly rendered if jaw scan 24 contains color (see FIG. 8C). This image is referred to as jaw image 415A. If jaw scan 24 has no color, a grayscale value is computed for each pixel of the 2D image from its corresponding 3D point using computer graphic rendering assuming that the jaw is lit from the front (see FIG. 8D). It should be further noted that the correspondence between 3D points in clenched-teeth scan 22 and pixels in teeth image 410A is known. Similarly, the correspondence between 3D points in jaw scan 24 and pixels in jaw image 415A is known.

Further, if there is a question about the accuracy or precision of the alignment between the two models then face landmark detection can be performed to bring the two models into closer alignment. Face landmark detection, such as that available from STASM, can be used to achieve a rough alignment between clenched-teeth scan 22 and jaw scan 24. For example, it can be used to identify the mouth opening. This provides enough accuracy for purposes of rendering 2D views of the frontal aspect of the two models but is not sufficient to achieve the desired alignment precision between clenched-teeth scan 22 and jaw scan 24.

The next major step is to obtain feature points for teeth image 410A and jaw image 415A and then match the feature points, i.e. identify feature points in each image that refer to the same feature. However, while a face scan includes color, a jaw scan typically does not include color. Thus, teeth image 410A is typically a color image while jaw image 415A is typically a grayscale image. In this case, an intermediate step, described hereinbelow with reference to FIGS. 8A-8E, is performed to generate a teeth image and a jaw image in which feature points can be extracted and matched.

FIGS. 8A-8E provide an example of the 2D images used by intermediate processing steps required to generate a 2D teeth image from a face scanner and a 2D jaw image from an intraoral scanner that are suitably similar to enable extraction of feature points from the two images.

FIG. 8A is an image of a frontal view of the teeth area of a subject, rendered from a clenched-teeth scan. It is a grayscale image.

FIG. 8B is a texture map that corresponds to the example of the clenched-teeth scan illustrated in FIG. 8A.

FIG. 8C is a grayscale image of a frontal view of the teeth area of the subject, rendered from a color jaw scan. In this case, the jaw scan includes color information; so the image has considerable detail.

Figure 8D:
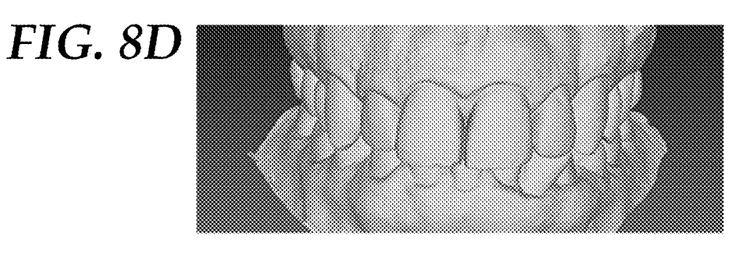
FIG. 8D is a 2D rendered view of a gray-scale jaw scan generated from a computer graphic rendering assuming the jaw model has close to a white color and is lit from the front.

FIG. 8D is a 2D rendered view of a gray-scale jaw scan generated from a computer graphic rendering assuming the jaw model has close to a white color and is lit from the front. The resulting 2D jaw image, although appearing to be different than the 2D image in FIGS. 8A & 8C, the tooth corner and edge features are similar and have been determined experimentally to convey adequate and reasonably comparable information to enable feature point extraction and matching as required by method 400.

At step 420 a feature extraction module extracts image features, referred to as feature points, also referred to as keypoints, from teeth image 410A. Similarly, at step 425 image feature points are extracted from jaw image 415A. Features points are typically distinctive invariant features in images and often correspond to corners or edges. Feature points can be obtained using an image detection algorithm such as inter alia SIFT (Scale-Invariant Feature Transform) or SURF (Speeded-Up Robust Features). SIFT is described in International Journal of Computer Vision, 2004 and also in U.S. Pat. No. 6,711,293, by David G. Lowe, which issued on Mar. 23, 2004. An implementation is available in the open source programming library OPENCV provided by OpenCV.org. OPENCV includes a function to find keypoints in an image. The function obtains, for each keypoint, its coordinates, size of neighborhood, angle which specifies its orientation, strength, and the like. Another function may be used to compute a descriptor for each keypoint. SURF has been described by Herbert Bay, et al. at the 2006 European Conference on Computer Vision.

Feature extraction from a typical image may yield hundreds of such feature points. Thus, the feature extraction set yields two sets of feature points, one for teeth image 410A and one for jaw image 415A.

Figure 5:
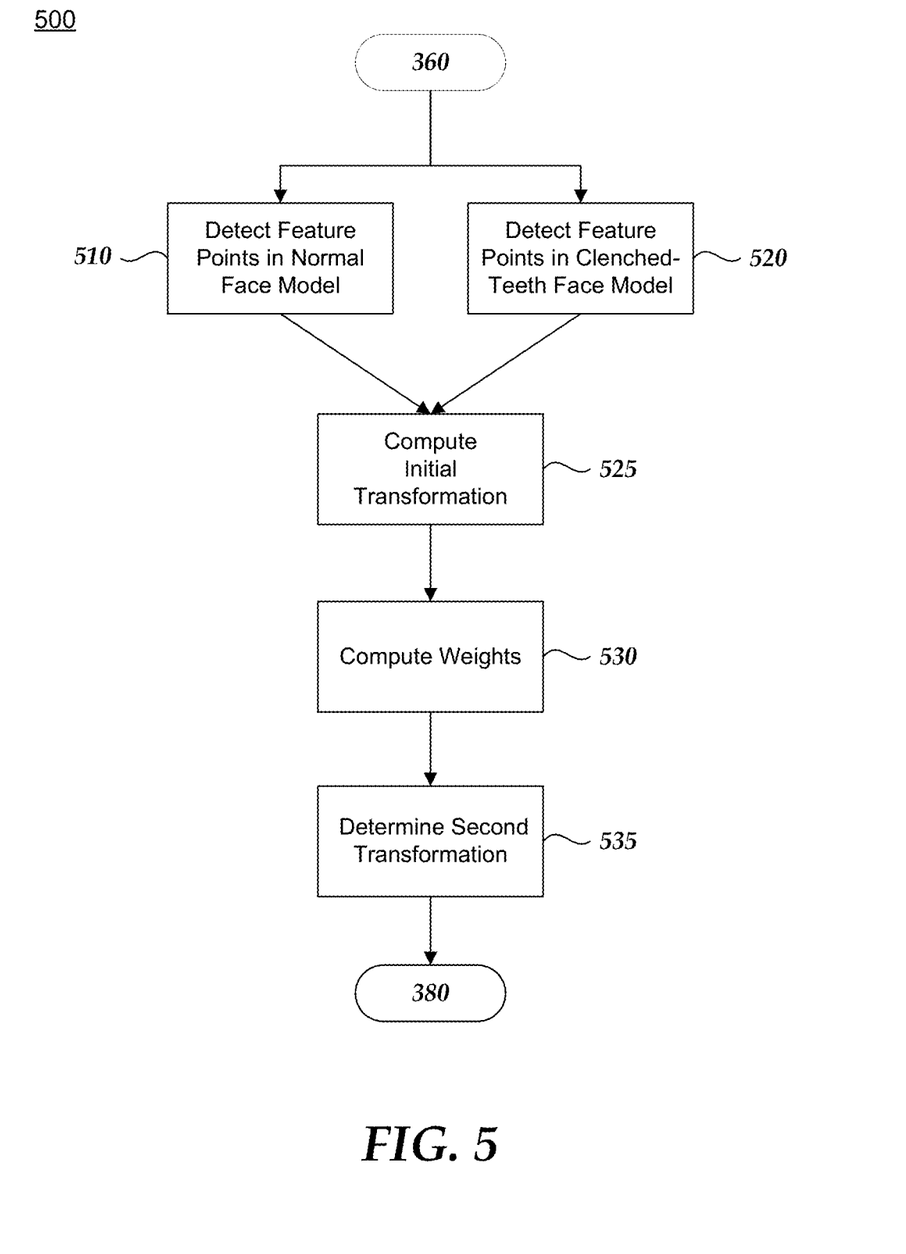
FIG. 5 is a flow diagram that presents one embodiment of a method that aligns a normal face scan with a clenched-teeth face scan.

It may be appreciated that while method 500, described hereinbelow, uses a facial landmark detector on normal face scan 20 and clenched-teeth face scan 22 because both scans represented the subject's face and thus included standard facial features such as eyes, eyebrows, nose, lips, etc. However, in method 400, alignment is being performed between a model of a face and a model of a jaw so facial landmark detection is not applicable; thus, feature point extraction and feature point matching are used in method 400 rather than facial landmark detection.

At step 430 feature points are matched between the image feature points extracted at step 420 for teeth image 410A and at step 425 for jaw image 415A. Matching is typically performed using a commercially available subsystem or library that implements a knows matching algorithm such as FLANN (Fast Approximate Nearest Neighbor Search). To minimize mis-matches, the global shift between the two images can be first estimated using a method such as image correlation. Once the two images are roughly aligned, feature matching can then be limited to a small neighborhood. Feature point pairs where (i) a feature point from teeth image 410A matches a feature point in jaw image 415A, or conversely (ii) a feature point from jaw image 415A matches a feature point in teeth image 410A are added to a set of feature point pairs. Each pair of feature points includes a matched 2D teeth point 430A and a matched 2D jaw point 430B.

At step 435 for each of the matched 2D jaw image points 430A, its corresponding 3D points in jaw model 22 is obtained; these are referred to as matched 3D jaw points. As previously mentioned, the 3D point in jaw scan 22 that generated the corresponding 2D point in jaw image 410A is known.

At step 440 the transformation required to align clenched teeth scan 22 to jaw scan 24 is computed using the iterative PnP algorithm which minimizes reprojection errors. PnP generates a matrix transformation that represents the rotation and translation required to align a 3D model, in this case, jaw scan 4 to a teeth image that is in what is referred to as a camera coordinate system. Thus, PnP takes as input matched 3D jaw scan points 435B and matched 2D teeth image points 430A, as well as a camera matrix that defines intraoral scanner 2 camera calibration parameters.

2. Align Normal Face Scan to Clenched-Teeth Face Scan 3D face models from the two face scans can be aligned using an algorithm called ICP (Iterative Closest Point). ICP is a well-known algorithm to find a relative transformation, i.e. rotation and translation, that aligns or "registers" two meshes, i.e. 3D models, in 3D space. One article that describes ICP is Chen, Yang; Gerard Medioni (1991). "Object modelling by registration of multiple range images". Image Vision Comput. Newton, Mass., USA: Butterworth-Heinemann: pp. 145-155. ICP requires that the two meshes be roughly aligned and it then iteratively finds a best transformation that minimizes some objective measurement such as the mean distance between the vertices. ICP converges faster when the two sets are already closely aligned and the data have substantial overlaps. ICP then proceeds to randomly select some number of matching points between the models based on distance. It then computes a transformation (X, Y, Z translation and rotation) from one model (clenched-teeth) to another (normal face) that minimizes the distance error of all the matching points. The process is repeated until the distance error is within a preset threshold. The result is a transformation or transformation matrix that best aligns clenched-teeth face model 22 to normal face model 20.

The benefit of this approach is that matching points between the two models are selected automatically without using any special external markers.

However, there are a few problems with using standard ICP to align two face models, including: (1) ICP requires the two models to be roughly aligned initially. However, the two face models are scanned at different times so the initial position and rotation of the two models may not be sufficiently close for ICP to work properly; and (2) ICP works best if the two models are identical or very similar in shape. The facial expression change (between normal expression and clenched-teeth) may cause ICP to incorrectly align facial regions that are very different and may create alignment errors.

FIG. 5 is a flow diagram that presents one embodiment of a method 500 that aligns normal face scan 20 with clenched-teeth face scan 22. Method 500 performs step 370 of method 300. It uses ICP but incorporates specific steps to solve the abovementioned two problems. From method 300 of FIG. 3, (1) a first 3D face scan of a subject's face, referred to as clenched-teeth face scan 22, is received from face scanner 4, and a second 3D face scan of the subject of the subject's face, referred to as normal face scan 20, is received from face scanner 4. Instructions may be displayed or verbally given to the subject to indicate what facial expression to adopt. As previously described, the subject is likely to be smiling in the facial expression captured in normal face scan 22 and the subject is typically going to have clenched teeth in clenched teeth face scan 22.

It is further assumed that face scanner 4 produces a 3D model, also referred to as a mesh, of the face of subject along with color information, referred to as a texture map, an example of which is given in FIG. 8B. Thus, each surface point on the mesh has a corresponding color value, and each texture map color pixel has a corresponding 3D mesh point. The texture map can be created with a 3D-to-2D projection method, such as the cylindrical projection described in "Reanimating real humans: Automatic reconstruction of animated faces from range data", which can be found on the worldwide web at [https://www.researchgate.net/figure/Cylindrical-projection-for-mapping-the-generic-facial-mesh-to-the-scan-surface_fig2_4124626. This approach preserves the shape of a face so that facial landmark detector described in steps 410 and 420 can still work on such projected texture maps.

At steps 510 and 520 an automatic facial landmark detector, such as STASM, is used to detect facial landmarks from the texture maps for normal face scan and clenched-teeth face scan. STASM is a programming library for finding features in faces based on the Active Shape Model. The Active Shape Model is described in an article entitled "Active Shape Models with SIFT Descriptors and Mars", which is available on the Worldwide Web at http://www-.milbo.org/stasm-files/active-shape-models-with-sift-and-mars.pdf. Information about the STASM programming library can be found on the Worldwide Web at http://www.milbo.users.sonic.net/stasm/. STASM operates on 2D images that show the front views of faces. Thus, a 2D frontal view of face scan 20 and of clenched-teeth face scan 22 are rendered and used with the STASM programming library. This results in a set of 2D points that indicate the outline of major facial features being identified for each respective image.

Figure 6:
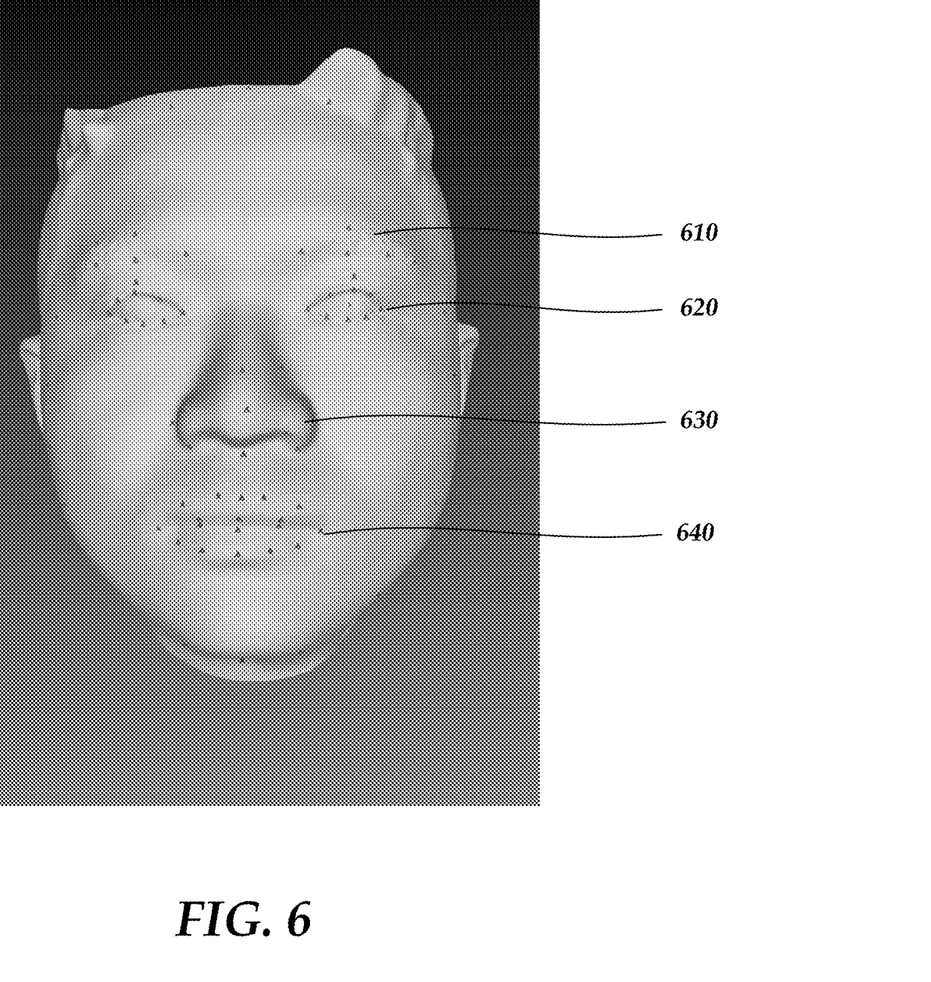
FIG. 6 illustrates one example of a set of 2D points extracted by the STASM programming library from an example image.

FIG. 6 illustrates one example of a set of 2D points extracted by the STASM programming library from an example image. One subset of points 610 indicate an eyebrow, another subset of points 620 indicates an eye 620, yet another subset of points indicates a nose 630 and a final subset indicates a mouth 640.

Once 2D landmark points for normal face scan 20 have been extracted, corresponding 3D feature points are computed from texture map point back projection. This yields a set of corresponding 3D feature points of normal face scan 20 to 2D feature points of clenched-face teeth scan 22.

At step 525, the matching 3D-to-2D feature points are used to compute an initial transformation that roughly aligns the two face models using an algorithm called Perspective-n-Point ("PnP") described in detail hereinbelow. This step is performed to to satisfy an initial condition of ICP. Since facial expression changes mostly affect points in the mouth and lower jaw areas, the method only uses matching points above the lower jaw to compute the initial transformation.

The ICP algorithm, to be used in the following step to obtain a transformation matrix that can be applied to clenched-teeth face scan 22 to bring it into alignment with normal face scan 20 operates on two sets of 3D points. ICP will iteratively select a random subset of points from clenched-teeth face scan, find their nearest points in normal face scan, and compute a transformation that minimizes the RMS (Root Mean Square) error between the two sub-sets of points until such error is below some pre-defined threshold. The RMS error can be computed with a different weight for each point. Since facial expression changes mostly affect points below the nose, the method applies a function that gives less weight (lower probability) for a point below the nose to be selected. A simple implementation can simply exclude any points below the nostrils from the selection. A more advanced implementation may compute the weights by measuring the effect of facial expression changes across some number of people.

Thus, at step 530 weights are computed for each matching feature point in clenched-teeth face scan 22 where a higher valued weight for a feature point indicates that the feature point is of higher importance and a lower valued weight indicates that the feature point is of lesser importance. The same weights are applied to matching points in normal face scan.

At step 535 ICP is applied to obtain a transformation matrix that can be applied to with normal face scan 20 to align it with clenched-teeth face scan 22.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for aligning a face scan with a jaw scan, comprising:
receiving a clenched-teeth face scan from a 3D scanner wherein a face scan is a 3D model of the face of a subject and wherein the subject's teeth are visible in the clenched-teeth face scan;
receiving a normal face scan from the 3D scanner of the face of the subject;
receiving a jaw scan from an intraoral scanner wherein a jaw scan is a 3D model that represents the jaw and frontal teeth of the subject;
determining a first transformation that aligns the clenched-teeth face scan with the jaw scan;
determining a second transformation that aligns the normal face scan with the clenched-teeth face scan; and
applying the first and second transformation to the normal face scan to align it with the jaw scan.

2. The method of claim 1, further comprising:
applying the first transformation to the clenched-teeth face scan to align it with the jaw scan.

3. The method of claim 1, wherein said determining a first transformation does not require the use of an external marker.

4. The method of claim 1, wherein said first transformation specifies a rotation and a translation in 3 dimensions.

5. The method of claim 1, wherein said clenched-teeth face scan depicts a subject whose top row and bottom row of teeth are both touching and visible.

6. The method of claim 1, wherein said jaw scan comprises either a 3D model of the subject's upper and lower jaw or a 3D model of only the upper jaw.

7. The method of claim 1, wherein said determining a first transformation comprises:
rendering a 2D frontal image of said clenched-teeth face scan;
rendering a 2D frontal image of said jaw scan;
extracting feature points from the 2D image of said clenched-teeth face scan;
extracting feature points from the 2D image of said jaw scan;
determining feature points between the two 2D images that match;
obtaining corresponding 3D points for each feature point in the 2D image of said jaw scan that matches a feature point in the 2D image of said clenched-teeth face scan; and
determining the first transformation is based on the obtained corresponding 3D points and the 2D image of said jaw scan.

8. The method of claim 7, wherein said determining the first transformation uses a Perspective-n-point (PnP) algorithm.

9. The method of claim 1, wherein said determining a second transformation does not require the use of an external marker.

10. The method of claim 1, wherein said second transformation specifies a rotation and a translation in 3 dimensions.

11. The method of claim 10, further comprising: computing weights for feature points detected in the clenched-teeth face model, wherein higher valued weights indicate features that are of greater importance and lower valued weights indicate features that are of lesser importance.

12. The method of claim 1, wherein said normal face scan depicts a subject that is smiling.

13. The method of claim 1, wherein said determining a second transformation comprises:
detecting feature points in the normal face model;
detecting feature points in the clenched-teeth face model;
computing an initial transformation; and
determining the second transformation based on the initial transformation.

14. The method of claim 1, wherein determining the second transformation uses the iterative first closest point (ICP) algorithm.

15. A device for aligning a face scan with a jaw scan, comprising a processor; a memory in communication with the processor for storing instructions, which when executed by the processor cause the device:
to receive a clenched-teeth face scan from a 3D scanner wherein a face scan is a 3D model of the face of a subject and wherein the subject's teeth are visible in the clenched-teeth face scan;
to receive a normal face scan from the 3D scanner of the face of the subject;
to receive a jaw scan from an intraoral scanner wherein a jaw scan is a 3D model that represents the jaw and frontal teeth of the subject;
to determine a first transformation that aligns the clenched-teeth face scan with the jaw scan;
to determine a second transformation that aligns the normal face scan with the clenched-teeth face scan; and
to apply the first and second transformation to the normal face scan to align it with the jaw scan.

16. The device of claim 15, wherein the instructions, when executed by the processor, further cause the device: to apply the first transformation to the clenched-teeth face scan to align it with the jaw scan.

17. The device of claim 15, wherein said determining a first transformation does not require the use of an external marker.

18. The method of claim 15, wherein said first transformation specifies a rotation and a translation in 3 dimensions.

19. The device of claim 15, wherein said clenched-teeth face scan depicts a subject whose top row and bottom row of teeth are both touching and visible.

20. The device of claim 15, wherein said jaw scan comprises either a 3D model of the subject's upper and lower jaw or a 3D model of only the upper jaw.

21. The device of claim 15, wherein said determining a first transformation comprises:
rendering a 2D frontal image of said clenched-teeth face scan;
rendering a 2D frontal image of said jaw scan;
extracting feature points from the 2D image of said clenched-teeth face scan;
extracting feature points from the 2D image of said jaw scan;
determining feature points between the two 2D images that match;
obtaining corresponding 3D points for each feature point in the 2D image of said jaw scan that matches a feature point in the 2D image of said clenched-teeth face scan; and determining the first transformation is based on the obtained corresponding 3D points and the 2D image of said jaw scan.

22. The device of claim 15, wherein said determining the first transformation uses a Perspective-n-point (PnP) algorithm.

23. The device of claim 15, wherein said determining a second transformation does not require the use of an external marker.

24. The device of claim 15, wherein said second transformation specifies a rotation and a translation in 3 dimensions.

25. The device of claim 15, wherein said normal face scan depicts a subject that is smiling.

26. The device of claim 15, wherein said determining a second transformation comprises:
detecting feature points in the normal face model;
detecting feature points in the clenched-teeth face model;
computing an initial transformation; and
determining the second transformation based on the initial transformation.

27. The device of claim 26, further comprising: computing weights for feature points detected in the clenched-teeth face model, wherein higher valued weights indicate features that are of greater importance and lower valued weights indicate features that are of lesser importance.

28. The device of claim 15, wherein determining the second transformation uses the iterative closest point (ICP) algorithm.

* * * * *